United States Patent [19]

Orpana

[11] 4,021,081
[45] May 3, 1977

[54] DRIVE SPROCKETS FOR VEHICLE TRACKS

[75] Inventor: Robert J. Orpana, Ste. Foy, Canada

[73] Assignee: Panatrac Manufacturing Corporation Limited, Toronto, Canada

[22] Filed: July 7, 1975

[21] Appl. No.: 594,138

[52] U.S. Cl. .............................. 305/35 R; 305/57
[51] Int. Cl.² ........................................ B62D 55/12
[58] Field of Search .............. 305/35 R, 36–38, 305/42, 53, 56–59; 74/229, 243 NC, 245 R, 245 P, 247, 250 S; 180/9.62

[56] References Cited
UNITED STATES PATENTS

| 1,613,598 | 1/1927 | Armstrong | 305/57 |
| 3,128,130 | 4/1964 | Harris | 305/57 X |
| 3,578,823 | 5/1971 | Clymer | 305/42 |
| 3,659,908 | 5/1972 | Comellas | 305/38 |

FOREIGN PATENTS OR APPLICATIONS 5,862  12/1882  United Kingdom .......... 74/243 NC Primary Examiner—Robert B. Reeves
Assistant Examiner—John P. Shannon
Attorney, Agent, or Firm—Rogers, Bereskin & Parr

[57] ABSTRACT

An endless track for a tracked vehicle is described. The track is driven by an arrangement which includes polygonal drive sprockets. Each sprocket has teeth at the corners of the polygon and outwardly curved surface portions between the teeth.

7 Claims, 6 Drawing Figures

DRIVE SPROCKETS FOR VEHICLE TRACKS

This invention relates generally to endless tracks for tracked vehicles. In particular, the invention is concerned with sprockets for engagement with tracks of the type which include a plurality of resilient traction element pivotally coupled together, and in which each said element has a generally flat upper surface with outwardly radiused leading and trailing end portions.

A problem with prior art sprocket arrangements is that, after initial engagement of a traction element by the sprocket, the element tends to suddenly "drop" into full engagement with the sprocket. This impact produces a dynamic shock load into the sprocket. Apart from any damage which may be caused, the repeated shock loads which occur as successive traction elements drop into engagement with the sprocket set up severe vibrations which make travelling in the vehicle unpleasant. A further problem occurs due to the fact that there is a linear velocity differential between the traction element-contacting surface of the sprocket and the element itself. This is because the said contacting surface of the sprocket and the centreline of the element lie on different effective radii from the centre of rotation of the sprocket. If the sprocket is driving the track, this velocity differential can produce high compressive stresses in the element at the point of driving engagement with the sprocket. Such stresses can lead to structural breakdown of the material of the traction element and/or sprocket.

U.S. Pat. No. 3,659,908 discloses an example of a prior art sprocket arrangement for a vehicle track.

An object of the present invention is to provide an improved sprocket for an endless vehicle track of the type referred to above.

According to the invention, the sprocket includes a peripheral surface which has the general profile of a regular polygon. The sprocket defines an axis of rotation at the geometrical centre of the polygon, and teeth at the corners of the polygon. Each tooth has opposite side edges formed by portions of said peripheral surface, said portions being inwardly radiused to conform generally with the outwardly radiused leading and trailing end portions of the upper surfaces of the traction elements of the track. The said peripheral surface of the sprocket includes portions between the teeth each defining a gentle positive curve so that, as the sprocket rotates in use, successive traction elements are engaged by said teeth and said positively curved surface portions progressively subject the upper surfaces of the elements to compressive loading cushioning movement of the elements into full engagement with the sprocket.

The invention will be better understood by reference to the accompanying drawings which illustrate one embodiment of the invention by way of example, and in which.

Figure 1:
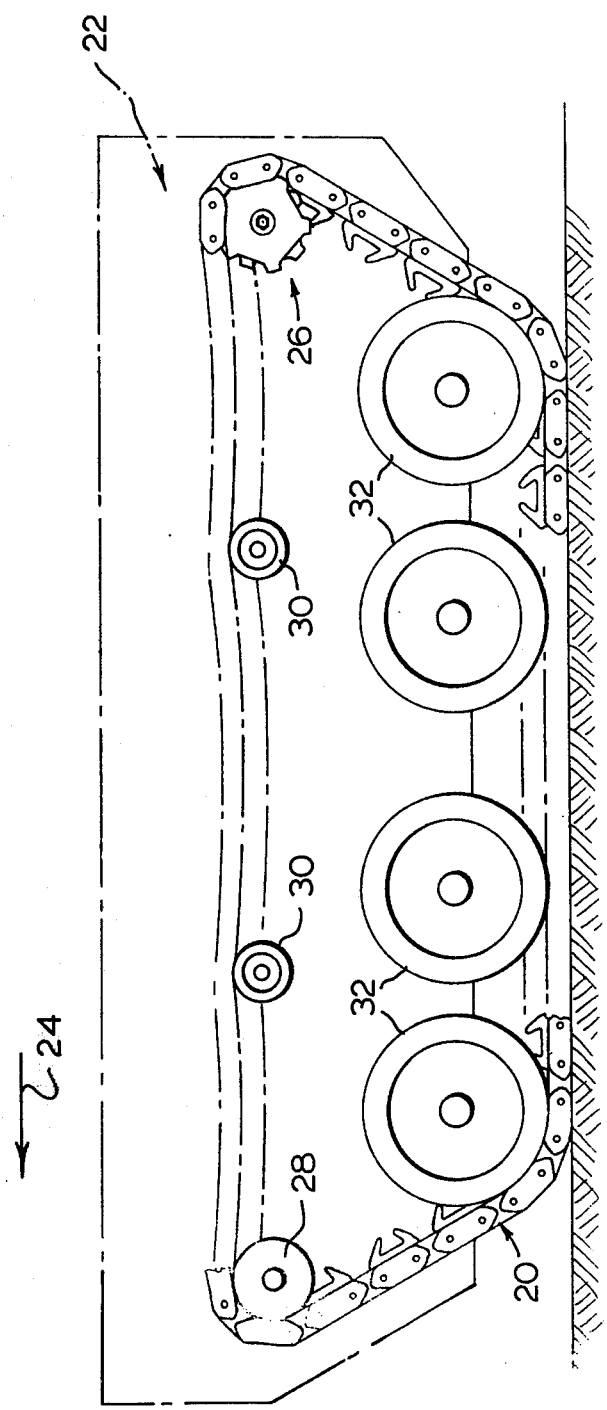
FIG. 1 is a diagrammatic illustration of a tracked vehicle fitted with an endless modular track driven by a drive sprocket arrangement according to the invention.

Referring first to FIG. 1, the track is generally indicated at 20 and is fitted to a conventional tracked vehicle 22. The vehicle itself forms no part of the present invention and is therefore illustrated in ghost outline only. The direction of forward motion of the vehicle is indicated by arrow 24. The vehicle is fitted with a drive sprocket arrangement generally indicated at 26 which drivably engages the track 20 and which is located adjacent the rear end of the vehicle. Adjacent the front end of the vehicle, the track passes around an idler wheel 28. The upper run of the track between sprocket 26 and wheel 28 is supported by idlers 30. Four road wheels 32 run on the upper surface of the lower run of the track.

It will of course be appreciated that FIG. 1 shows one side of the vehicle only and that a second, similar track arrangement is provided at the opposite side of the vehicle.

Figure 2:
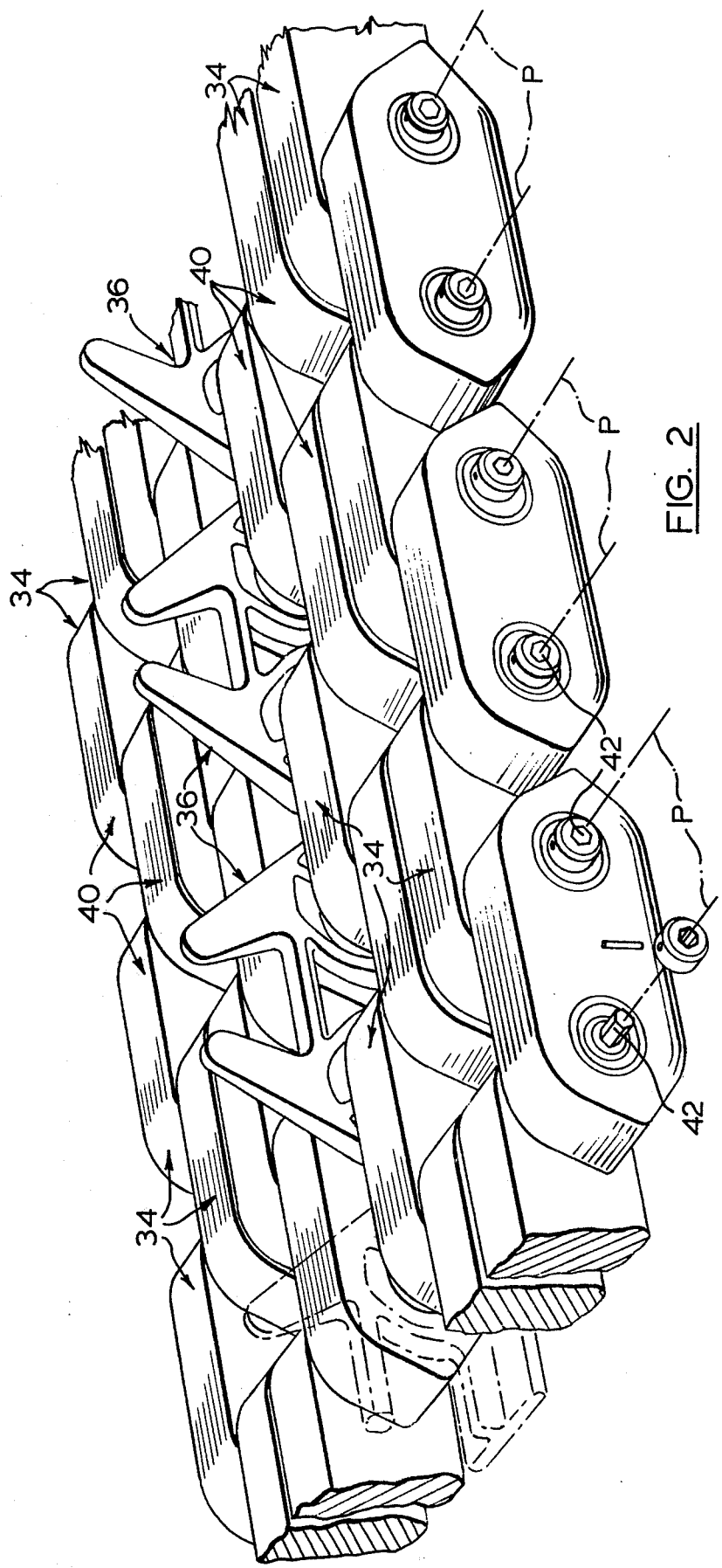
FIG. 2 is a perspective view of a section of the track shown in FIG. 1.

Referring now more particularly to FIG. 2, the track is made up of a plurality of track elements of two types: (a) traction elements denoted 34, and (b) guiding elements denoted 36. The elements are modular in the sense that each element occupies a similar area of the track. The elements are coupled together by coupling means (to be described) which define pivot axes P extending transversely of the track. Both the traction elements and the guiding elements contact the ground when the track is in use. The traction elements present upper surfaces which are contacted by the road wheels 32 of the vehicle. The guiding elements serve to locate the track laterally in use by contact with road wheels 32. The road wheels 32 are arranged in pairs on respectively opposite sides of the row of guiding elements 36 and the track is guided primarily by abutment of the guiding elements with the inner surfaces of the road wheels. The idlers 28 and 30 are similarly provided in pairs.

Figure 3:
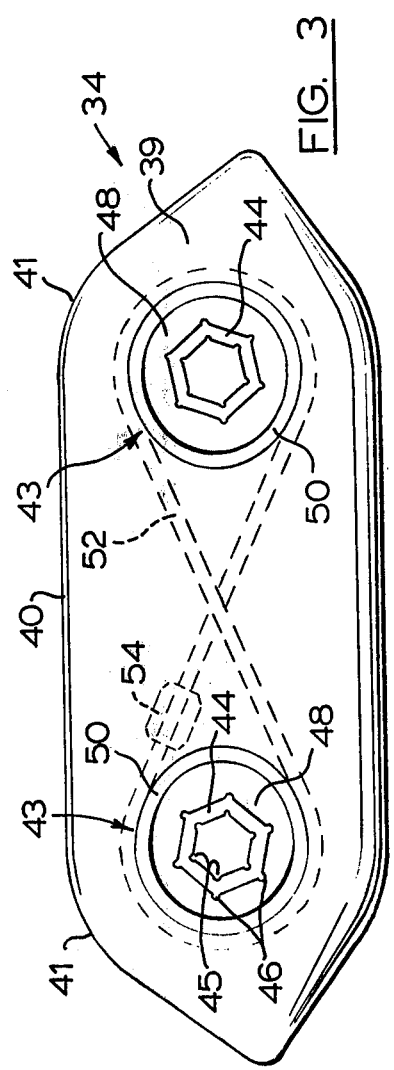
FIG. 3 is a side view of one of the traction elements of the track of FIG. 2.

FIG. 3 shows one of the traction elements separate from the track. The element is in the form of an elastomeric module and includes a body 39 of a resilient elastomeric material. The body is moulded to the shape shown and has tapered ends. The body 39 is adapted for contact with the ground in use and includes a flat upper road wheel-contacting surface 40 having outwardly radiused leading and trailing end portions 41. The element is provided adjacent each end with an assembly 43 for coupling the element with other elements in the track. Each assembly 43 is intended to receive one of a series of hexagonal shafts 42 (see FIG. 2) which couple the elements of the track. The assemblies 43 each include a hexagonal inner sleeve 44 which is made of hardened steel and which is shaped to receive one of the hexagonal shafts 42. As can be seen, the inner surface of sleeve 44 is formed with longitudinal recesses 45 at the corners of the hexagon defined by the sleeve. These recesses make for easier fitting of the shaft 42 into the sleeve in that the recesses accomodate any imperfections at the corners of the shaft. The corners of the hexagonal outer surface of sleeve 44 are formed with small protrusions 46 complementary to the recesses mentioned above.

Each sleeve 44 is bonded inside a bush 48 which is also of an elastomeric material and which is of elliptical shape in cross-sectiion as can be seen from FIG. 3. The bush 48 is in turn bonded inside an elliptical outer sleeve 50 which is moulded into the elastomeric body 40 of the traction element and is bonded to the material from which the element is made.

Moulded inside the elastomeric body 40 are two cables 52 (only one of which is visible in FIG. 3). Each cable is looped around both of the sleeves 50 in a crossed configuration and the opposed ends of the cable are joined by a sleeve 54. The cables act as tension members inside the traction element.

The elastomeric traction element described above forms the subject of co-pending patent application Ser. No. 594,140 of even date herewith entitled "Traction element for a vehicle track".

Figure 4:
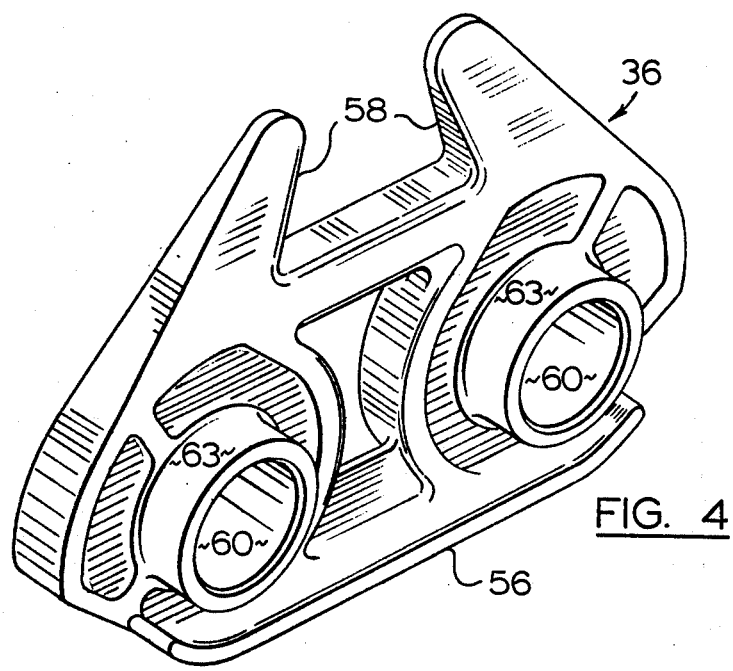
FIG. 4 is a perspective view of one of the track guiding elements of the track of FIG. 2.

FIG. 4 shows one of the guiding elements 36 of the track of FIG. 2. The element is cast and machined in steel and defines a lower ground-engaging surface 56 and two upwardly projecting and inwardly directed lugs 58. The body of the element also defines two transverse circular openings 60, each of which receives a coupling assembly 62 (see FIG. 5) similar to the assembly 43 of FIG. 3. The openings are surrounded by lateral cylindrical projections 63. The spacing between the centres of the two openings 60 is equal to the spacing between the centres of the sleeves 44 in the traction element 34.

The guiding element forms the subject of co-pending patent application Ser. No. 594,141 of even data herewith entitled "Guiding element for a vehicle track".

Figure 5:
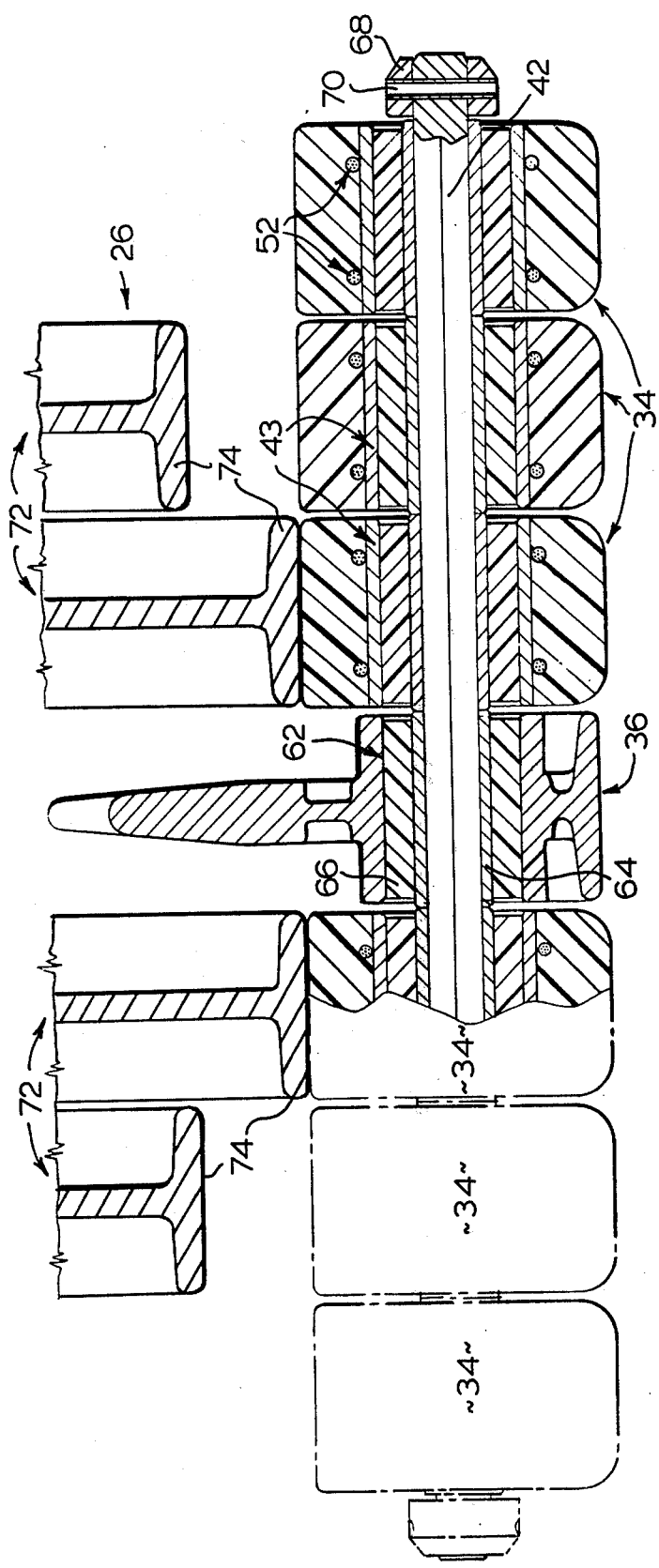
FIG. 5 is a partial transverse section through the track at the position of the sprocket arrangement; and, FIG. 6 is a side view of the drive sprocket arrangement.

Reference will now be made to FIG. 5 in describing how the elements of the track are assembled. In the particlular track configuration under discussion, three rows of traction elements are provided on each side of a single row of guiding elements (FIG. 2). FIG. 5 is a section taken at the position of one of the coupling shafts 42 of the track.

Each of the openings 60 in each guiding element 36 receives a coupling assembly generally indicated at 62 which is similar to the assemblies 42 of FIG. 3 but without the outer sleeve. Each assembly 62 includes an inner sleeve 64 of hexagonal shape (similar to the inner sleeves 44 of the assemblies 43) and an elliptical elastomeric bush 66 (similar to the busher 48).

The track elements are arranged as shown in FIG. 2 and each of the shafts 42 is inserted through aligned coupling assemblies 43 of relevant traction elements and the appropriate coupling assembly 62 of the guiding elements. It will be noted that the ends of the inner sleeves 44 and 64 of the coupling assemblies 43 and 62 respectively project slightly and are arranged in abutment with one another so as to space the track elements slightly transversely of the track. Each end of each shaft 42 receives a collar 68 attached to the shaft by hollow cylindrical spring pin 70.

It will be appreciated that the shafts 42 define the pivot axes P referred to in connection with FIG. 2. The shafts allow the track elements to turn with respect to one another about the axes P as the track curves in following its drive path in use. As the elements move about said axes p, torsional forces are applied to the elastomeric bushes 48 (in the case of traction elements) and 66 (in the case of the guiding elements). These forces cause distortion of the bushes allowing the elements to pivot. The fact that the bushes are elliptical in shape inhibits turning of the bushes under the effects of the said torsional forces.

Figure 6:
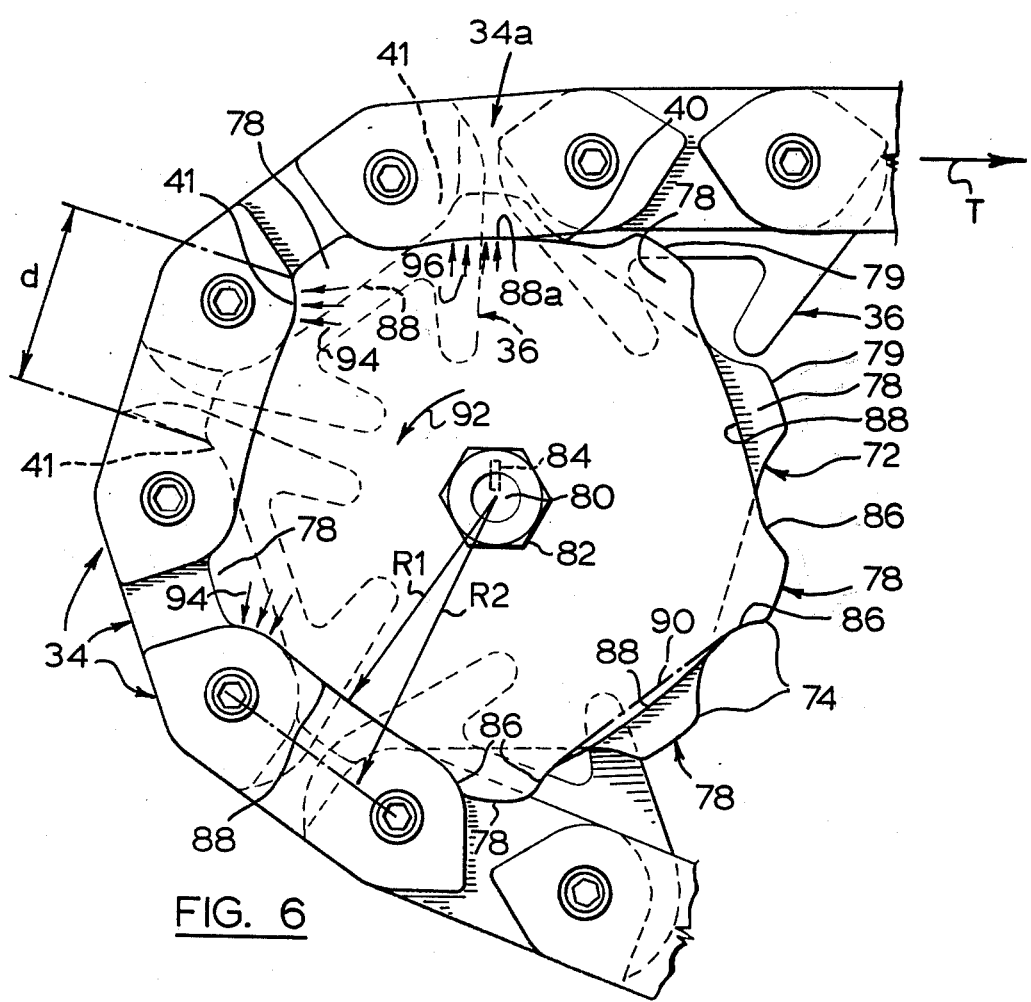

FIGS. 5 and 6 illustrate the drive sprocket arrangement 26 (FIG. 1) for the track. Two sets of sprockets are provided and engage the traction elements 34 of the track on respectively opposite sides of the central row of guiding elements 36. Each sprocket set is made up of two angularly offset sprockets 72. Each sprocket has a peripheral surface 74 which has the general profile of a regular pentagon. As can be seen from FIG. 5, surface 74 is in fact formed by a double flange extending around the periphery of the sprocket so as to define a relatively broad traction element-engaging surface. Each sprocket also defines an aperture at the geometrical centre of the pentagon and driving teeth 78 at the corners of the pentagon. The teeth have slightly convex outer ends 79 resulting in a "stubby" appearance.

A shaft 80 (FIG. 6) driven from the vehicle to which the track is fitted extends through the apertures of all four sprockets. The sprockets are keyed to the shaft and secured by clamping nuts 82 (FIG. 6). One of the keys is indicated in dotted outline at 84 in FIG. 6. The keys are arranged so that the two sprockets in each pair are offset from one another by 36° so that the two sprockets together define ten driving teeth. The keys are also arranged so that the respective pairs are synchronised (FIG. 5) to ensure symmetrical drive of the track. As can be seen from FIG. 6, the angular spacing between successive teeth in each pair is generally equal to the distance d between the radiused trailing end portions 41 of successive traction elements.

Each of the driving teeth 78 of each sprocket 72 has opposite side edges 86 formed by portions of the said peripheral surface 74, which portions are radiused inwardly to conform generally with the radiused leading and trailing end portions 41 of the traction elements. Accordingly, as can be seen from FIG. 6, the surface portion 86 snugly engage the radiused portions 41 of the traction elements. The portions 88 of surface 74 between successive teeth in each sprocket have a gentle outward curve as can be seen by reference to rectilinear chain dotted line indicated at 90 in FIG. 6. The portions 88 merge smoothly into the side edges 86 of the teeth to define a smooth profile.

In FIG. 6, the direction of sprocket rotation is indicated by arrow 92. The traction element indicated at 34a at the top of FIG. 6 is just moving into engagement with the outer drive sprocket 72 shown in this view. One of the teeth 78 is engaged between the leading end of element 34a and the trailing end of the preceding element and is driving on the trailing end portion 41 of that element. The arrows 94 indicated the compressive load applied to the element by the driving tooth 78.

In the position of FIG. 6, the outwardly curved surface portion indicated at 88a of sprocket 72 is in contact with the flat road-wheel contacting surface 40 of element 34a along approximately half of its length. As the sprocket continues to turn in the direction of arrow 92, the track will advance and element 34a will move into a position in which the whole of its surface 40 is in contact with the outwardly curved surface 88a of sprocket 72. This movement of element 34a into contact with sprocket 72 is cushioned due to the outward curve of surface 88a and the tension T in the track. Thus, as the element moves into full contact with sprocket 72, the outward curved surface portion 88a imparts a progressive compressive load to the upper surface 40 of the traction element as indicated by arrows 96. Due to the resilient nature of the element, this load is absorbed by slight distortion of the element so that a smooth, progressive, impact-free shock absorbing engagement of the track with the sprocket is achieved.

As discussed in connection with the prior art, the effective radius R1 of the traction element-contacting surfaces of the sprocket differs from the effective radius R2 of the centerline of the traction elements. As a result of this difference in radii, a linear velocity differential occurs between the elements and the sprocket causing slippage of the elements on the sprocket. However, as a result of the gently curved and smoothly profiled form of sprockets 72, this slippage can be absorbed without damage to the traction elements or to the sprockets.

It should finally be observed that the preceding description applies to a specific embodiment of the invention and that many modifications are possible within the broad scope of the invention.

For example, the sprockets need not be used in pairs as described. A single driving sprocket could be used. Further, the or each sprocket need not be of pentagonal shape as described. The sprocket may be of any polygonal shape having a reasonable number of driving teeth.

Although the sprockets 72 are described as driving sprockets, sprockets according to the invention may, of course, be used as idlers. In fact, the idler wheel 28 of FIG. 1 could be in this form.

The track itself need not be of the specific form described. For example, the traction elements (34) may be made of any suitable elastomeric or plastic material and may each be provided with one or more internal cables or other tension members. The guiding elements (36) may be made of any suitable metal, plastic or elastomeric material. Each guiding element may have a single upwardly projecting guide formation. Further, the deformable bushes in the coupling assemblies of the track elements may be made of any suitable elastomeric or plastic material. With respect to the arrangement of the track elements, reference may be made to copending patent application Ser. No. 594,139 of even date herewith entitled "Improvements in vehicle tracks".

It is also to be understood that FIG. 1 of the drawings is merely a schematic illustration of one type of vehicle to which the sprocket arrangement could be fitted. As has been explained, the vehicle of FIG. 1 is fitted with two tracks located at respectively opposite sides of the vehicle. Accordingly the sprocket arrangement shown in the drawings will be duplicated at the other side of the vehicle. In an alternative type of vehicle, additional tracks and corresponding sprockets may be provided. Some or all of these tracks may be mounted on steerable sub-assemblies pivotally coupled to the body of the vehicle in question.

The drive sprocket (26) could be located adjacent the front of the vehicle at the idler wheel (28) adjacent the rear end of the vehicle. Of course, the number of road wheels (32) at the number of supporting idlers (30) may also vary. In fact the idlers may be omitted in some arrangements.

What I claim is:

1. In combination, a sprocket and an endless track in engagement with said sprocket;
    the track including a plurality of resilient traction elements pivotally coupled together, each element having a generally flat upper surface with outwardly radiused leading and trailing end portions;
    and the sprocket including a peripheral surface which has the general profile of a regular polygon, the sprocket defining: an axis of rotation at the geometrical center of the polygon; and teeth at the corners of the polygon; each tooth having opposite side edges formed by portions of said peripheral surface, said portions being inwardly radiused to conform generally with said outwardly radiused leading and trailing end portions of the upper surfaces of the traction elements, and the said peripheral surfaces including portions between the teeth each defining a gentle outward curve, whereby, as the sprocket rotates in use, successive traction elements are engaged by said teeth and said outwardly curved surface portions progressively subject the upper surfaces of the elements to compressive loading cushioning movement of the elements into full engagement with the sprocket.

2. a combination as claimed in claim 1 wherein said peripheral surface of the sprocket is of generally pentagonal profile.

3. A combination as claimed in claim 2, wherein said traction elements of the vehicle track are arranged in at least two parallel rows with the elements in the respective rows longitudinally offset with respect to one another by an amount substantially equal to half the length of each traction element, and wherein the combination further comprises a second, similar sprocket, the two sprockets engaging the respective rows of traction elements and being arranged side by side with their axes of rotation coincident with one another and with the teeth of the respective sprockets angularly offset by 36° with respect to one another.

4. A combination as claimed in claim 1, wherein said peripheral surface is formed by a double peripheral flange providing a relatively wide traction element-engaging surface.

5. The combination of:
    1. an endless vehicle track comprising:
    a plurality of track elements including:
        a. traction elements each in the form of a resilient module defining a flat upper road wheel contacting surface having outwardly radiused leading and trailing end portions and a lower ground contacting surface and including coupling means adjacent each respectively opposite end of the module, each said coupling means including a resiliently deformable bush by which the module is coupled to adjacent elements in the track;
        b. guiding elements adapted to locate the track laterally in use, each said guiding element defining lower ground engaging surface and including coupling means adjacent each respectively opposite end of the element, each said means including a resiliently deformable bush for the purpose of coupling the guiding element with adjacent elements in the track;
    a plurality of transverse shafts coupling together said track elements by way of said bushes so that the track elements define an endless track configuration, said shafts defining pivot axes which extend transversely of the track whereby each said element is pivotable about two such axes located adjacent respectively opposite ends of the element; and
    2. a sprocket engaging said track, the sprocket including a peripheral surface which has the general profile of a regular polygon and the sprocket defining: an axis of rotation at the geometrical center of the polygon; and teeth at the corners of the polygon; each tooth having opposite side edges formed by portions of said peripheral surface, said portions being inwardly radiused to conform generally with said outwardly radiused leading and trailing end portions of the upper surfaces of the traction elements, and the said peripheral surface including portions between the teeth each defining a gentle outward curve, whereby, as the sprocket rotates in use, successive traction elements are engaged by said teeth and said outwardly curved surface portions progressively subject the upper surfaces of the elements to compressive loading cushioning movement of the elements into full engagement with the sprocket.

6. In a tracked vehicle having at least one endless track for moving the vehicle over a surface, and a sprocket in engagement with the track, the improvement wherein the track includes a plurality of resilient traction elements pivotally coupled together, each element having a generally flat upper surface with the outwardly radiused leading and trailing end portions; and wherein the sprocket includes a peripheral surface which has the general profile of a regular polygon, the sprocket defining: an axis of rotation at the geometrical center of the polygon; and teeth at the corners of the polygon; each tooth having opposite side edges formed by portions of said peripheral surface, said portions being inwardly radiused to conform generally with said outwardly radiused leading and trailing end portions of the upper surfaces of the traction elements, and the said peripheral surface including portions between the teeth each defining a gentle outward curve, whereby, as the sprocket rotates in use, successive traction elements are engaged by said teeth and said outwardly curved surface portions progressively subject the upper surfaces of the elements to compressive loading cushioning movement of the elements into full engagement with the sprocket.

7. A tracked vehicle which includes:

at least one endless track for moving the vehicle over a surface, the track including a plurality of resilient traction elements pivotally coupled together, each element having a generally flat upper surface with outwardly radiused leading and trailing end portions; and, a sprocket for engagement with the track, the sprocket including a peripheral surface which has the general profile of a regular polygon, the sprocket defining: an axis of rotation at the geometrical center of the polygon; and teeth at the corners of the polygon; each tooth having opposite side edges formed by portions of said peripheral surface, said portions being inwardly radiused to conform generally with said outwardly radiused leading and trailing end portions of the upper surfaces of the traction elements, and the said peripheral surface including portions between the teeth each defining a gentle outward curve, whereby, as the sprocket rotates in use, successive traction elements are engaged by said teeth and said outwardly curved surface portions progressively subject the upper surfaces of the elements to compressive loading cushioning movement of the elements into full engagement with the sprocket.

* * * * *